(12) United States Patent
Mease et al.

(10) Patent No.: US 6,826,055 B2
(45) Date of Patent: Nov. 30, 2004

(54) MOVABLE MODULE FOR COMPUTER SYSTEM AND METHOD OF USE

(75) Inventors: Keith D. Mease, Gibbstown, NJ (US); Sean M. McClain, Havertown, PA (US); Norman K. Newman, Hatfield, PA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 10/390,876

(22) Filed: Mar. 17, 2003

(65) Prior Publication Data

US 2004/0184243 A1 Sep. 23, 2004

(51) Int. Cl.[7] .................................................. H05K 7/16
(52) U.S. Cl. .................... 361/725; 395/800; 312/223.1; 364/708.1
(58) Field of Search ................................ 361/724–727; 395/800; 312/223.1–223.6; 364/708.1, 146; 345/169, 905

(56) References Cited

U.S. PATENT DOCUMENTS 5,115,511 A * 5/1992 Nilsson et al. .................. 713/1
5,896,273 A * 4/1999 Varghese et al. ............. 361/724
6,144,549 A * 11/2000 Moss et al. .................. 361/681

* cited by examiner

Primary Examiner—Hung Van Duong
(74) Attorney, Agent, or Firm—Lisa A. Rode; Mark T. Starr; RatnerPrestia

(57) ABSTRACT

A computer system is provided. The computer system includes a computer chassis at least partially defining an interior. The computer system also includes a module configured for movement with respect to the computer chassis along an insertion axis between a retracted position substantially within the interior of the computer chassis and an extended position at least partially withdrawn from the interior of the chassis. The module includes a housing configured to extend within the interior of the chassis. The housing includes a body portion configured to move with respect to the computer chassis along the insertion axis, and a pivoting portion coupled to the body portion to pivot between a retracted position substantially aligned along the insertion axis and an extended position oriented at an angle with respect to the insertion axis.

21 Claims, 8 Drawing Sheets

MOVABLE MODULE FOR COMPUTER SYSTEM AND METHOD OF USE

FIELD OF THE INVENTION

This invention relates to a movable module for accessing a portion of a computer system, and, more particularly, to a movable I/O module for accessing PCI cards in a computer system.

BACKGROUND OF THE INVENTION

In the serviceability of computer systems it is often desirable to provide for access to and removal of certain system components, while maintaining operation of the remainder of the computer system. For example, in order to repair, replace, upgrade, and troubleshoot components in a computer system, "hot-swapability" of certain components is desirable. The ability to access and remove such components from the I/O system is particularly desirable, including PCI expansion cards such as network and disk control cards.

One method for accessing PCI cards is to locate the PCI module adjacent to a computer system cover so that the PCI cards in the module can be accessed when the cover is removed. Unfortunately, it is often difficult to locate a PCI module adjacent to the system cover. Further, even when the PCI module can be positioned adjacent to the system cover, often the system cover cannot be opened enough to provide for removal of a PCI card.

For example, in a rack-mounted computer system, if the PCI module is positioned adjacent to the top, bottom, or sides of the system, the entire system is typically shut down in order to access a PCI card in the PCI module.

Certain rack-mounted computer systems have been provided with sliding drawers upon which the computer system can be provided in the rack. In order to access a part of the system such as the PCI module, the drawer is slid out to an accessible position. One deficiency of such a system is that it requires additional interconnect length (thus additional flight time) between systems. In such a configuration, the entire system is slid out on the drawer, and because of the weight of the computer system, the rack may become unbalanced when the drawer is slid out. Another problem with this type of configuration is that long bundles of cables are typically used to connect the drawer mounted computer system to other components mounted in the rack. These cables often result in undesirable impedance levels and occupy a substantial volume within the rack.

As such, it would be desirable to provide a module such as an I/O module that is accessible while maintaining operation of the host computer system, and that overcomes the above-recited deficiencies.

SUMMARY OF THE INVENTION

In an exemplary embodiment of the present invention, a computer system is provided. The computer system includes a computer chassis at least partially defining an interior. The computer system also includes a module configured for movement with respect to the computer chassis along an insertion axis between a retracted position substantially within the interior of the computer chassis and an extended position at least partially withdrawn from the interior of the chassis. The module includes a housing configured to extend within the interior of the chassis. The housing includes a body portion configured to move with respect to the computer chassis along the insertion axis, and a pivoting portion coupled to the body portion to pivot between a retracted position substantially aligned along the insertion axis and an extended position oriented at an angle with respect to the insertion axis.

In another exemplary embodiment of the present invention, a computer system is provided. The computer system includes a computer chassis at least partially defining an interior and having a processor assembly positioned within the interior. The computer system also includes an I/O module coupled to the processor assembly. The I/O module is configured for movement with respect to the computer chassis along an insertion axis between a retracted position substantially within the interior of the computer chassis and an extended position at least partially withdrawn from the interior of said chassis.

In yet another exemplary embodiment of the present invention, a method of accessing an I/O card in an I/O module is provided, where the I/O module is connected to a processor assembly in a computer chassis. The method includes sliding the I/O module with respect to the processor assembly from a retracted position proximal the processor assembly and substantially within the interior of the computer chassis to an extended position spaced from the processor assembly and at least partially withdrawn from the interior of the computer chassis. The method also includes accessing the I/O card in the I/O module.

In yet another exemplary embodiment of the present invention a method of accessing an interior of an I/O module connected to a processor assembly of a computer system having a computer chassis at least partially defining an interior is provided. The method includes sliding the module along an insertion axis from a retracted position proximal the processor assembly and substantially within the interior of the computer chassis to an extended position spaced from the processor assembly and at least partially withdrawn from the interior of the computer chassis. The method also includes pivoting a pivoting portion of the housing from a retracted position substantially aligned with the insertion axis to an extended position oriented at an angle with respect to the insertion axis.

BRIEF DESCRIPTION OF THE DRAWINGS

Exemplary embodiments of the invention will be described with reference to the drawings, of which.

DETAILED DESCRIPTION OF THE INVENTION

Figure 1:
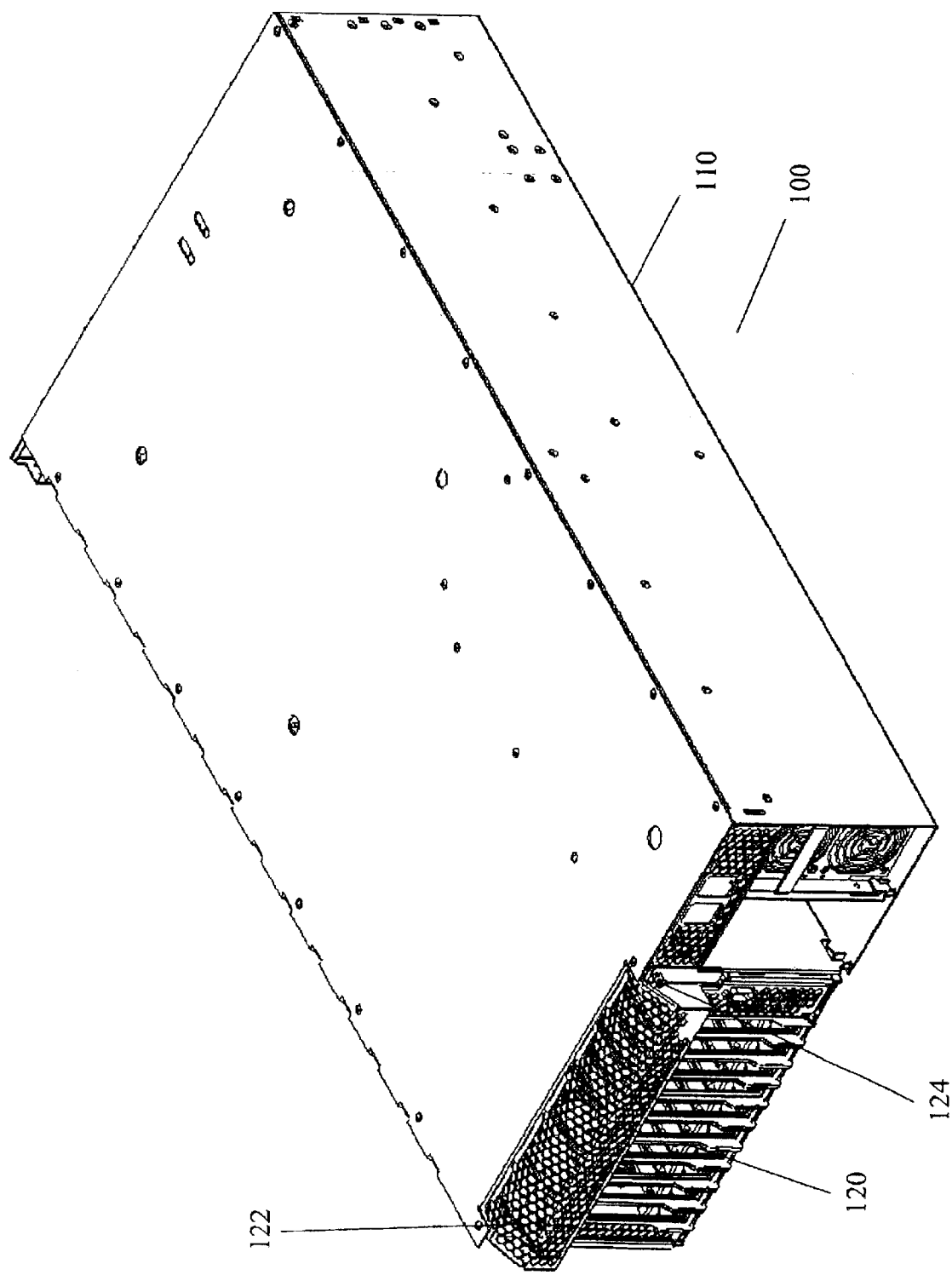
FIG. 1 is a perspective view of a computer system including an I/O module in a retracted position in accordance with an exemplary embodiment of the present invention.

Preferred features of selected embodiments of this invention will now be described with reference to the figures. It will be appreciated that the spirit and scope of the invention is not limited to the embodiments selected for illustration. Also, it should be noted that the drawings are not rendered to any particular scale or proportion. It is contemplated that any of the configurations and materials described hereafter can be modified within the scope of this invention.

Referring to the figures generally, according to an exemplary embodiment of the present invention, a computer system such as computer server system 100 is provided. Computer server system 100 includes computer chassis 110 at least partially defining an interior. Computer server system 100 is also includes module 120 configured for movement with respect to computer chassis 110 along an insertion axis between a retracted position substantially within the interior of computer chassis 110 and an extended position at least partially withdrawn from the interior of computer chassis 110.

Module 120 includes a housing configured to extend within the interior of chassis 110. The housing includes body portion 120A configured to move with respect to computer chassis 110 along the insertion axis, and pivoting portion 120B coupled to body portion 120A and configured to pivot between a retracted position substantially aligned along the insertion axis and an extended position oriented at an angle with respect to the insertion axis.

In another exemplary embodiment of the present invention, a computer server system 100 is provided. Computer server system 100 includes computer chassis 110 at least partially defining an interior and having a processor assembly positioned within the interior. Computer server system 100 also includes I/O module 120 coupled to the processor assembly. I/O module 120 is configured for movement with respect computer chassis 110 along an insertion axis between a retracted position substantially within the interior of computer chassis 110 and an extended position at least partially withdrawn from the interior of computer chassis 110.

In yet another exemplary embodiment of the present invention, a method of accessing an I/O card in an I/O module is provided, where the I/O module is connected to a processor assembly in a computer chassis. The method includes a step 600 of sliding the I/O module with respect to the processor assembly from a retracted position proximal the processor assembly and substantially within the interior of the computer chassis to an extended position spaced from the processor assembly and at least partially withdrawn from the interior of the computer chassis. The method also includes a step 604 of accessing the I/O card in the I/O module.

In yet another exemplary embodiment of the present invention, a method of accessing an interior of an I/O module connected to a processor assembly of a computer server system having a computer chassis at least partially defining an interior is provided. The method includes a step 600 of sliding the module along an insertion axis from a retracted position proximal the processor assembly and substantially within the interior of the computer chassis to an extended position spaced from the processor assembly and at least partially withdrawn from the interior of the computer chassis. The method also includes a step 602 of pivoting a pivoting portion of the housing of the module from a retracted position substantially aligned with the insertion axis to an extended position oriented at an angle with respect to the insertion axis.

By allowing the module (e.g., an I/O module) to move with respect to the rest of the system, the least length-critical bus (the I/O bus) is extended. The impedance levels and system volume are therefore not significantly impacted.

Referring specifically to FIG. 1, a computer system 100 is provided. For example, computer system 100 is a cellular computer module for use in a rack-mounted computer server system. Computer system 100 includes a chassis 110 for housing components of the computer system (e.g., a processor card, a memory card, etc.). Computer system 100 also includes I/O module 120. In the exemplary embodiment illustrated in FIG. 1, I/O module 120 is shown in a retracted position, housed substantially within chassis 110.

I/O module 120 includes shield cover 122 for shielding the components (e.g., PCI cards) housed within I/O module 120 with respect to electromagnetic interference. I/O module 120 also includes fastener 124. When computer system 100 is mounted in a rack, I/O module 120 is desirably positioned at either the front or rear of the rack so that it is accessible while computer system 100 is in operation. In order to access a component (e.g., a PCI card) housed within I/O module 120, I/O module 120 is at least partially withdrawn from chassis 110 (i.e., I/O module 120 is brought from the retracted position illustrated in FIG. 1 to an extended position shown in FIG. 2 along an insertion axis).

Fastener 124 secures I/O module 120 in the retracted position. As such, in order to move I/O module 120 from the retracted position to an extended position, fastener 124 is disengaged. Fastener 124 may be any of a number of fasteners useful for securing two components such as I/O module 120 and chassis 110 (e.g., a screw, a bolt, a latch, a clip, etc.). Before or after fastener 124 is disengaged, shield cover 122 may also be removed (or pivoted to an open position).

Figure 2:
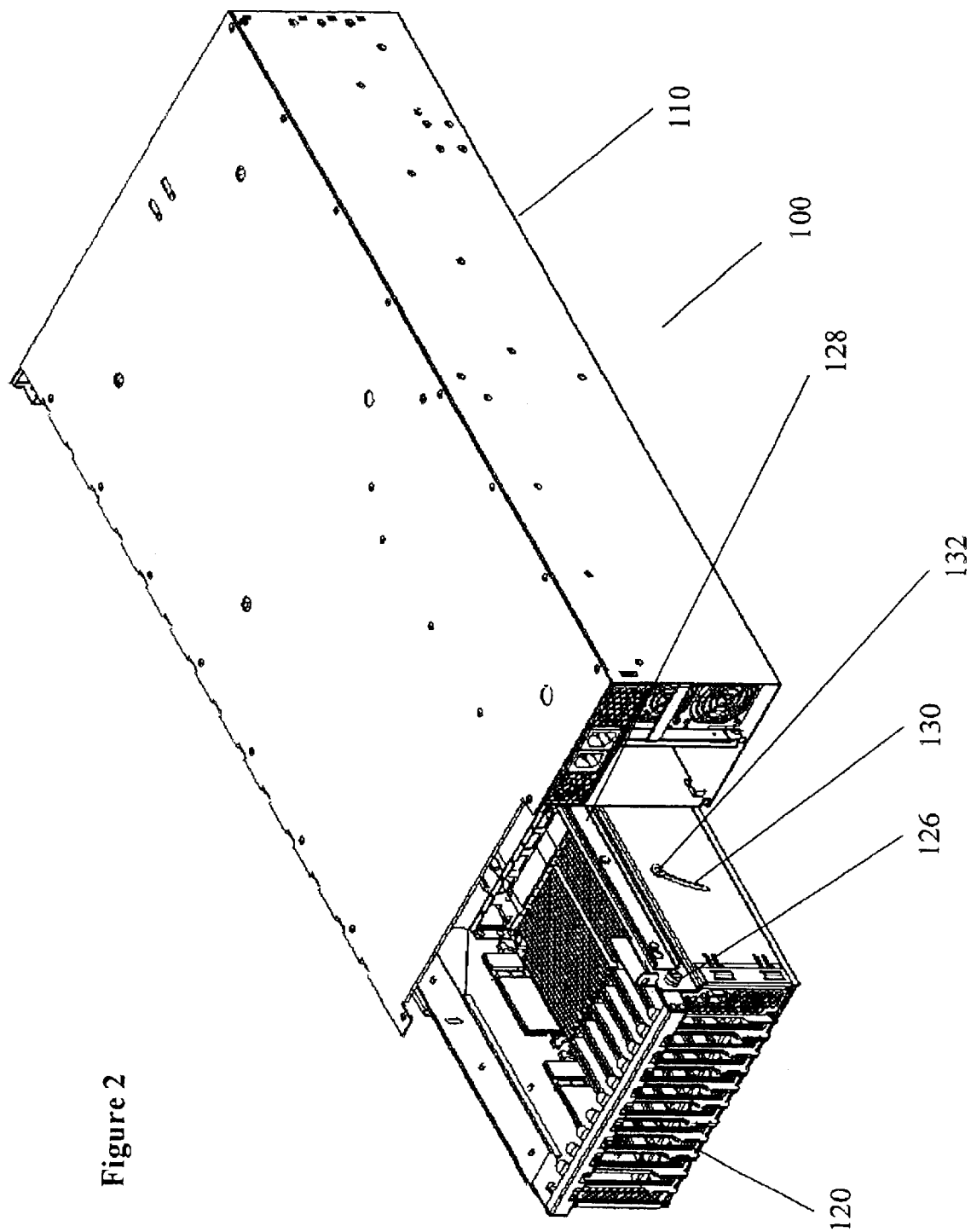
FIG. 2 is a perspective view of the computer system shown in FIG. 1 with the I/O module in an extended position.

FIG. 2 is another perspective view of computer system 100. Computer system 100 includes chassis 110 and I/O module 120. In the view provided in FIG. 2, shield cover 122 has been removed. Further, I/O module 120 has been brought from the retracted position illustrated in FIG. 1 to an extended position where I/O module 120 is at least partially withdrawn from chassis 110. In this extended position, certain I/O components can be accessed and removed from I/O module 120. In this extended or withdrawn position, the components housed within I/O module 120 are still in operation and connected to the remainder of the computer system, which also remains in operation when I/O module 120 is moved between the extended and retracted positions.

For example, I/O module 120 may be connected to the remainder of the computer system (particularly to a processor assembly) using a flex circuit (also known as a flexible circuit or a flexible circuit board). The flex circuit facilitates movement of I/O module 120 from the retracted position to the extended position while maintaining operation of computer system 100. A flexible circuit interconnection occupies a small volume within chassis 110, and provides conductive paths between I/O module 120 and the remainder of the computer system having substantially uniform impedance.

Figure 7:
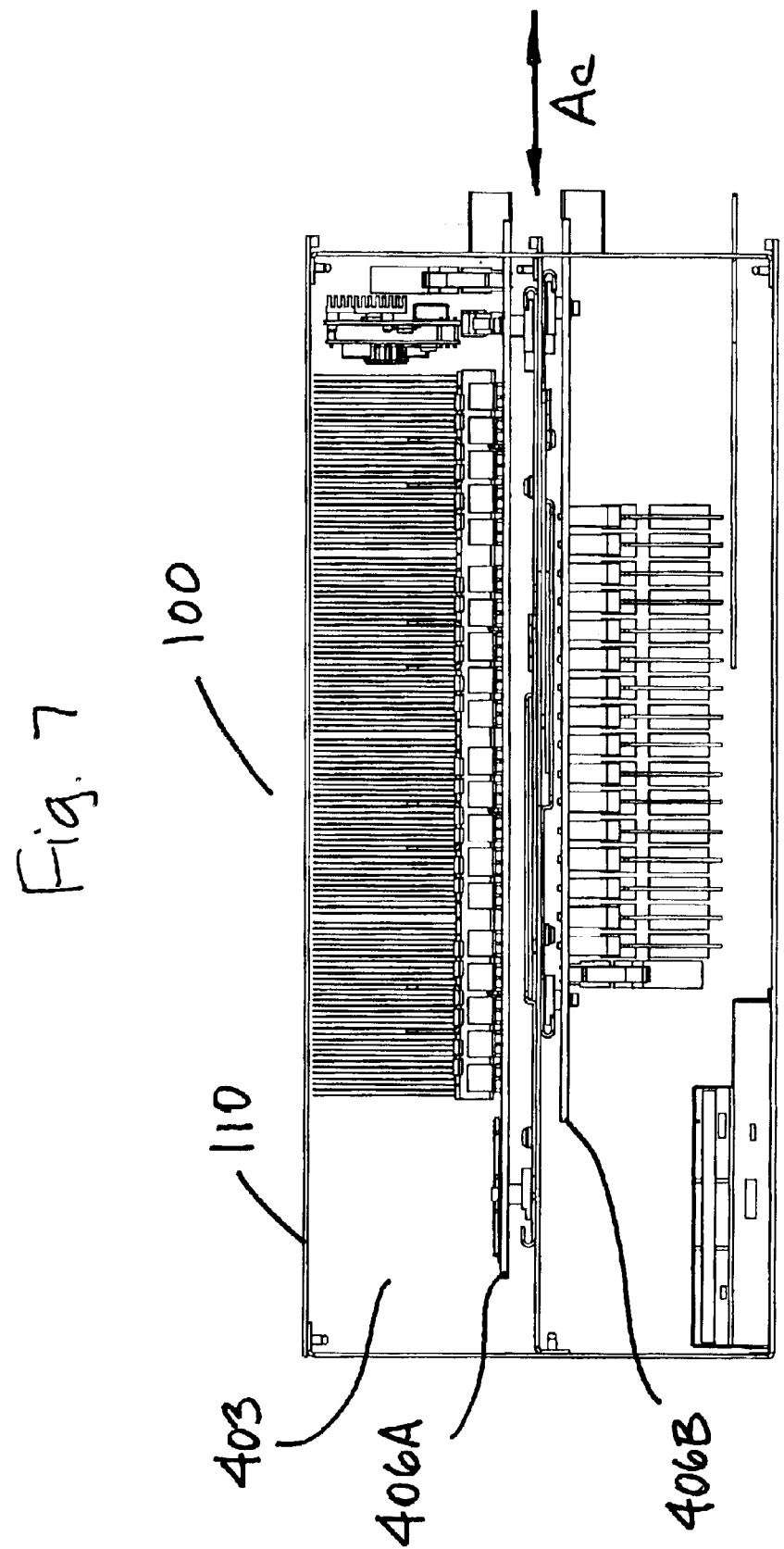
FIG. 7 is a rear view of the computer system shown in FIG. 1.
Figure 8:
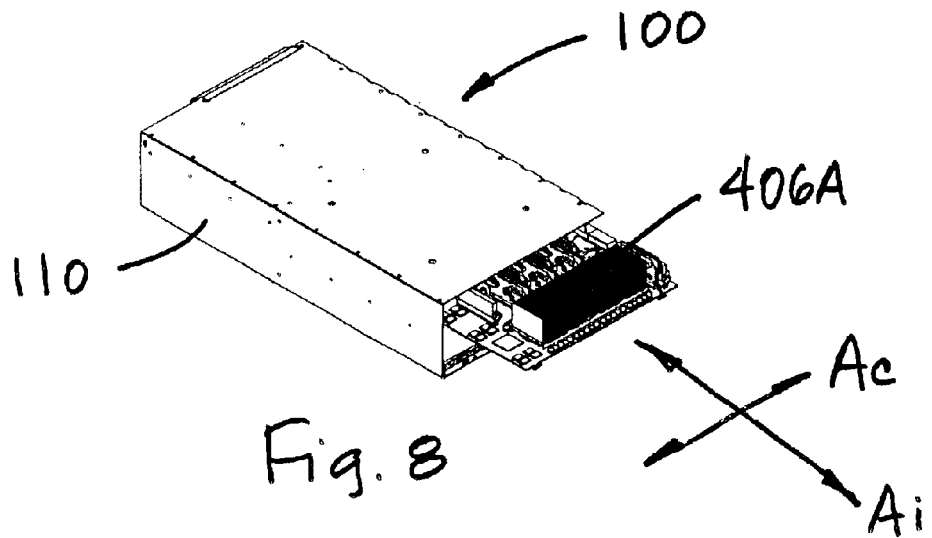
FIG. 8 is a perspective rear view of the computer system shown in FIG. 1 with a processor assembly partially removed for illustrative purposes.
Figure 9:
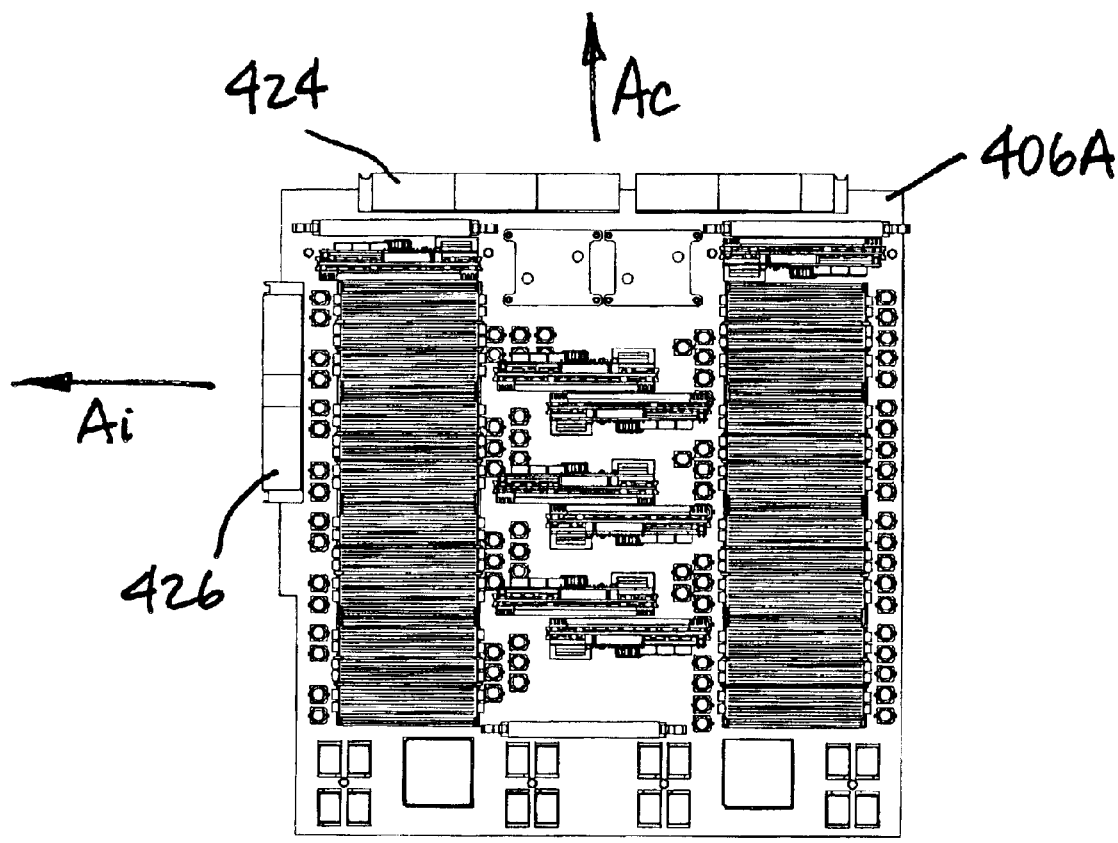
FIG. 9 is a plan view of an exemplary embodiment of a processor assembly configured for use in the computer-system shown in FIG. 1.

Further details regarding the connection between the I/O module and the remainder of the computer system will be provided with reference to FIGS. 7 through 9.

FIG. 2 illustrates guide rail 128 coupled to a side wall of I/O module 120. Although not visible in FIG. 2, another guide rail 128 is positioned on the opposite side wall of I/O module 120. Guide rails 128 mate with respective guide rail receivers mounted within chassis 110 (not visible in FIG. 2). When guide rails 128 are slid with respect to the guide rail receivers, I/O module 120 is moved between its extended and retracted positions. Through this motion between the extended and retracted positions, I/O module 120 is moved along an insertion axis (i.e., the axis along which I/O module 120 is inserted into and withdrawn from chassis 110).

Although certain components in I/O module 120 may be accessible in the extended position, other components within I/O module 120 may not be accessible in the extended position. For example, a component within I/O module 120 may be too large to be removed through the opening provided when I/O module 120 is in the extended position illustrated in FIG. 2.

In order to provide access to such components, I/O module 120 is provided with a housing for housing I/O components such as I/O cards. The housing includes a body portion and a pivoting portion that can be pivoted towards an extended position, thereby providing a larger opening to access components within I/O module 120. As will be explained more clearly by reference to FIG. 3, a pivot pin 132 and corresponding pivot slot 130 are provided to facilitate the pivoting of the pivoting portion of I/O module 120 with respect to the body portion of I/O module 120. Although FIG. 2 only illustrates one pivot pin 132 and one corresponding pivot slot 130, I/O module 120 may desirably include a second pivot pin 132 and corresponding pivot slot 130 on its opposite side (not visible in FIG. 2). Also, although the pivot pin 132 is shown on the pivoting portion and the slot is formed in the body portion, the pivot pin 132 can be provided on the body portion and the slot can be formed in the pivoting portion. Further, it is contemplated that other equivalent means can be provided for facilitating pivotal movement of the pivoting portion with respect to the body portion.

Fastener 126 is also illustrated in FIG. 2. Another fastener 126 may also be provided on the opposite side of I/O module 120 (not visible in FIG. 2). When fastener(s) 126 are in an engaged position, the pivoting portion so of I/O module 120 can not be pivoted with respect to the remaining portion of I/O module 120. Therefore, in order to pivot the pivoting portion, fastener(s) 126 should be disengaged. Fastener(s) 126 may be any of a number of fasteners useful for securing the pivoting portion of I/O module 120 to the non-pivoting portion of I/O module 120 (e.g., a screw, a bolt, clip, latch, etc.).

Figure 3:
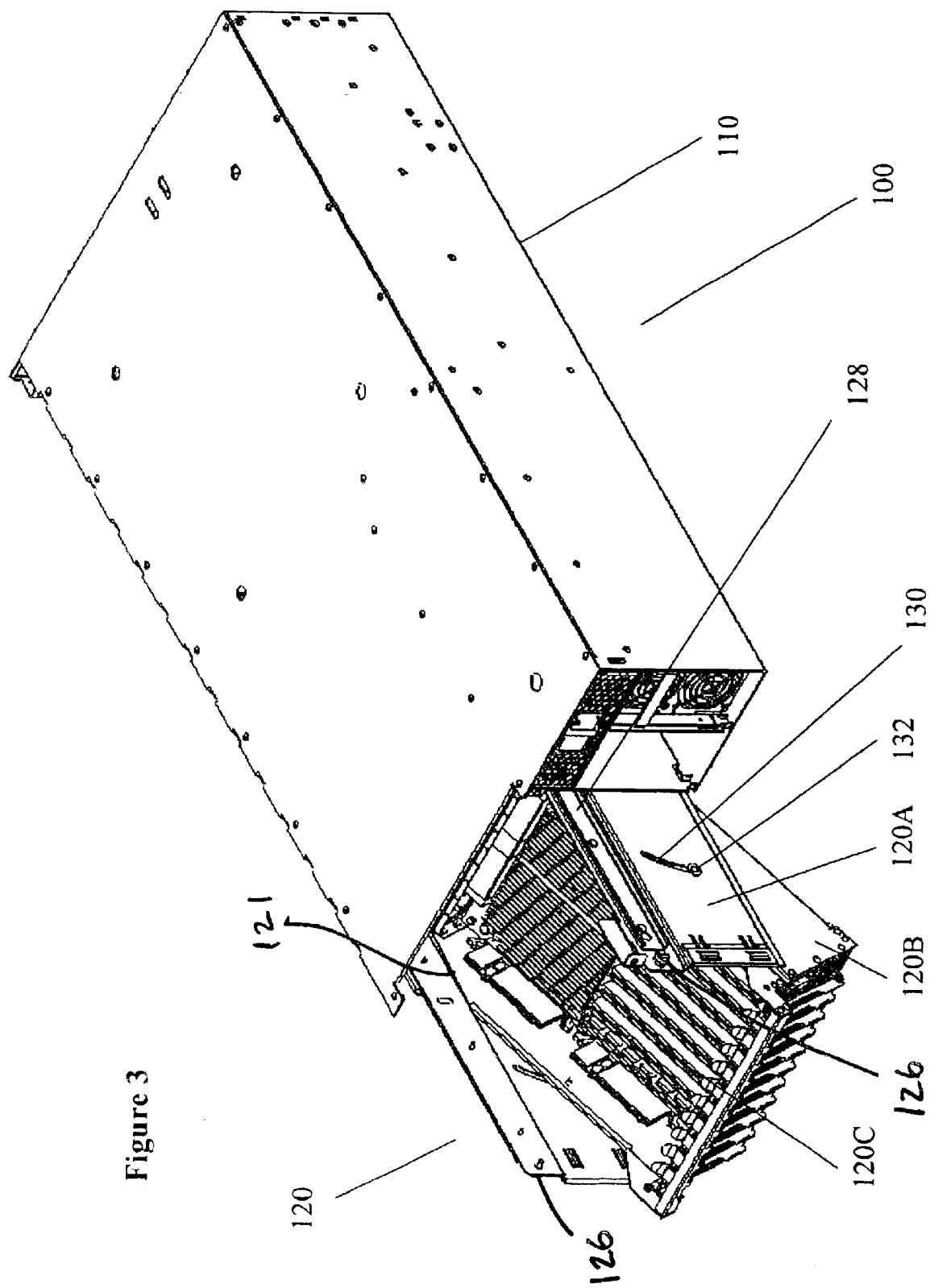
FIG. 3 is a perspective view of the computer system shown in FIGS. 1 and 2 with the I/O module in an extended and pivoted position in accordance with an exemplary embodiment of the present invention.

Referring again to FIG. 3, I/O module 120 includes a housing having body portion 120A, pivoting portion 120B, and interior region 120C. As described above, guide rails 128 are used in conjunction with guide rail receivers housed within chassis 110 in order to move I/O module 120 from its retracted position (as shown in FIG. 1) to an extended position (as shown in FIGS. 2 and 3). When in this extended position, fastener(s) 126 may be disengaged to allow pivoting portion 120B to pivot at an angle with respect to body portion 120A. The pivoting action of pivoting portion 120B is facilitated in part by pivot pin(s) 132 and corresponding pivot slot(s) 130. As shown in FIG. 3, pivot pin 132 has slid to the bottom of its range of motion within pivot slot 130. This is in contrast to the position of pivot pin 132 at the top of its range of motion within pivot slot 130, as shown in the retracted position in FIG. 2.

As such, pivoting portion 120B can be moved between a retracted position where it is substantially aligned with the insertion axis of I/O module 120 and an extended position where pivoting portion is oriented at an angle with respect to the insertion axis. As shown in FIG. 3, when pivoting portion 120B is pivoted downwardly at an angle with respect to the insertion axis, greater access is provided to interior region 120C of I/O module 120. As such, greater accessibility and serviceability are provided for the components housed within or adjacent to I/O module 120.

Figure 4:
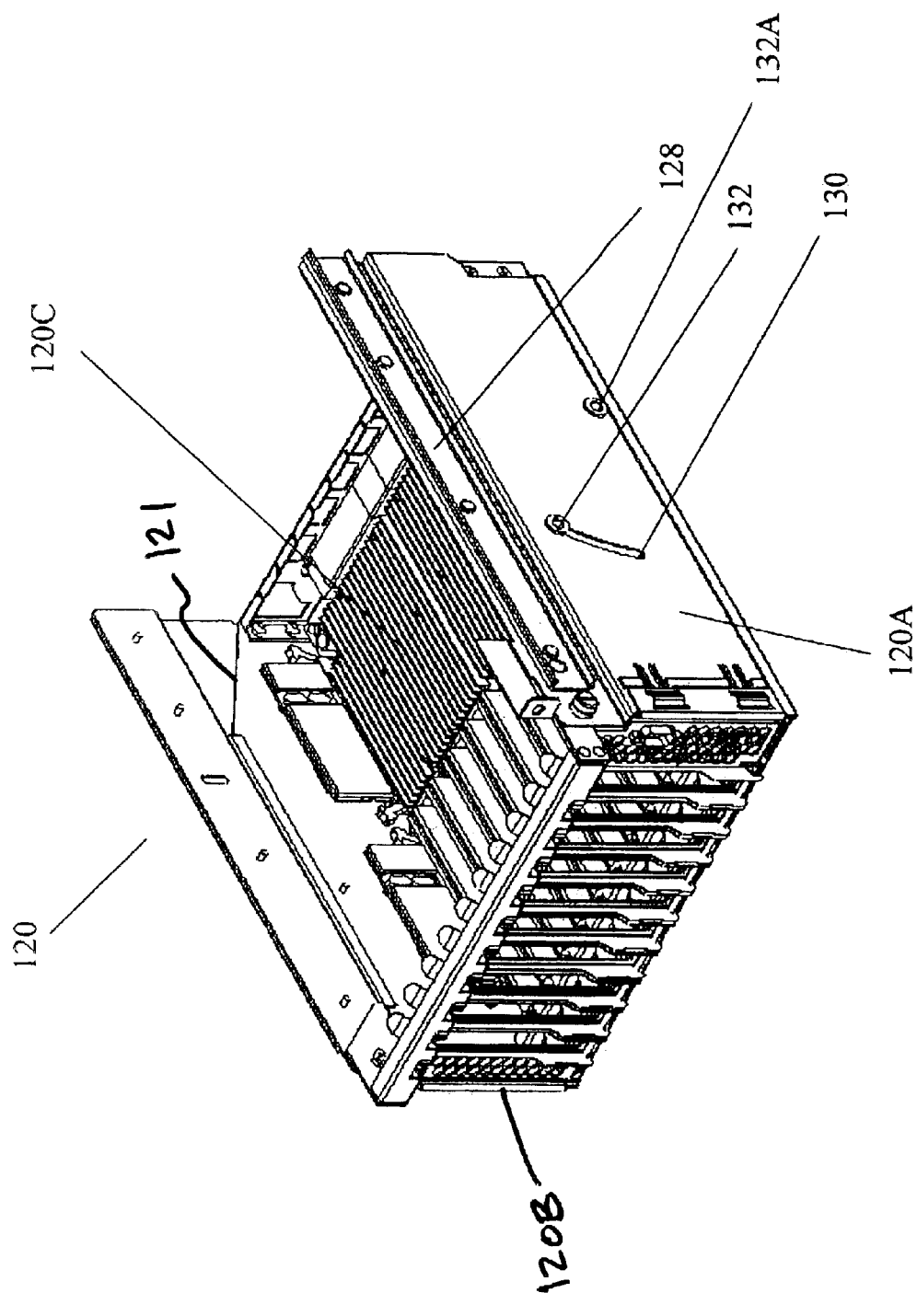
FIG. 4 is a perspective view of components of an I/O module in accordance with an exemplary embodiment of the present invention.

FIG. 4 is a perspective view of I/O module 120 removed from chassis 110. In this view, pivoting portion 120B is in a retracted position with respect to body portion 120A, and as such, pivot pin 132 is at the top of its range of motion within pivot slot 130. In the exemplary embodiment illustrated in FIG. 4, guide rail(s) 128 extend substantially the entire length of I/O module 120. As such, I/O module may be withdrawn from chassis 110 almost its entire length when in the extended position illustrated in FIG. 2.

An angled edge surface 121 provided toward the rear of pivoting portion 120B permits pivotal motion of the pivoting portion 120B with respect to the body portion 120A. As illustrated in the pivoted position in FIG. 3, the edge surface 121 provides clearance for movement of the rear of pivoting portion 120B. Edge surface 121 also abuts a mating surface of the body portion 120A to provide additional support when in the extended position.

The pivoting action of pivoting portion 120B is facilitated not only through pivot pin(s) 132 and pivot slot(s) 130, but also through the use of pivot pin(s) 132A. Pivot pin(s) 132A are fixed in that they are not movable within a pivot slot as is pivot pin 132. Pivot pin 132A secures body portion 120A to pivoting portion 120B. As such, when in the pivoted position shown in FIG. 3, pivoting portion 120B is still connected to body portion 120A by pivot pin 132A. In other words, pivot pins 132A on each side of the module 120 together define a pivot axis about which the pivoting portion 120B pivots with respect to the body portion 120A.

Figure 5:
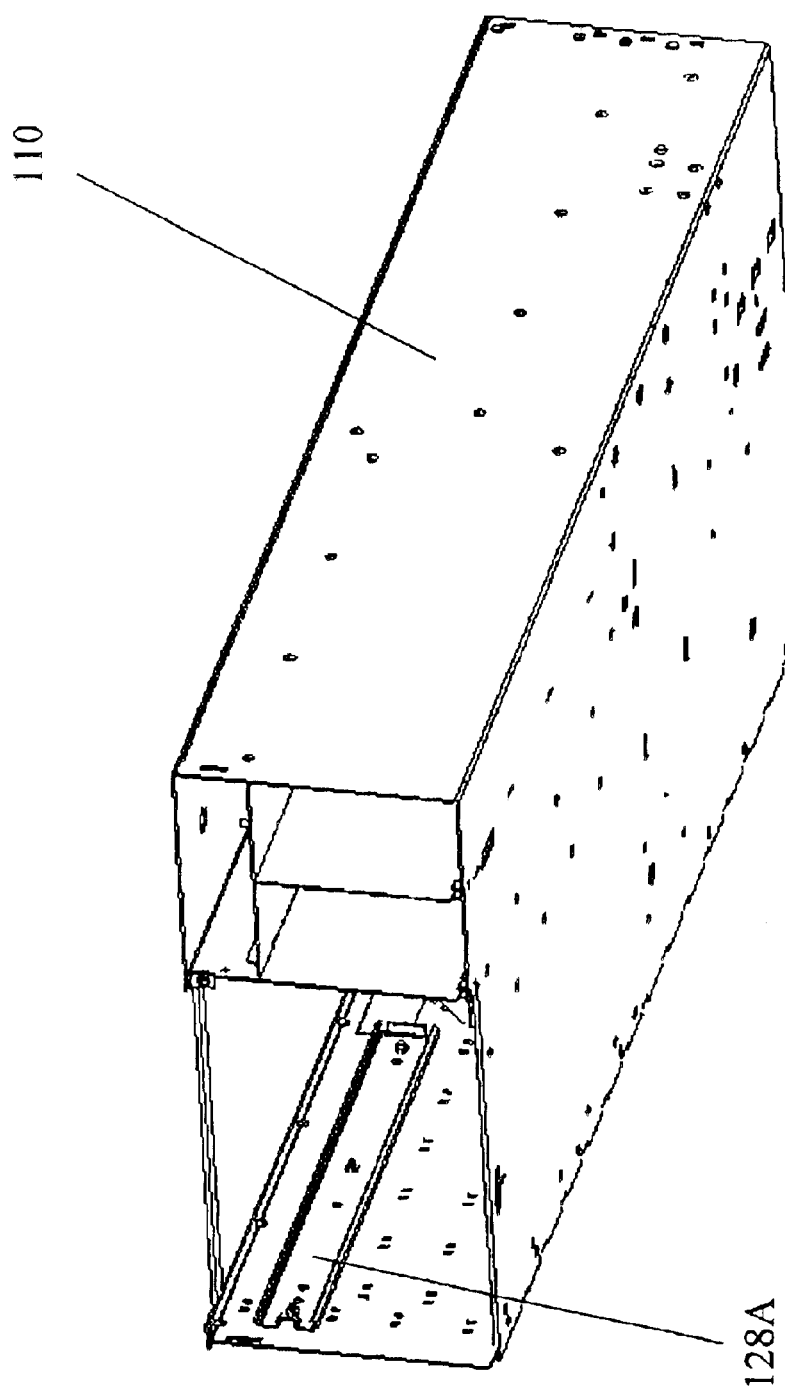
FIG. 5 is a perspective view of a chassis for receiving an I/O module in accordance with an exemplary embodiment of the present invention.

FIG. 5 is a perspective view of chassis 110. In this view, I/O module 120 has been completely withdrawn from chassis 110, thereby exposing one of the guide rail receivers 128A. As described above, when I/O module 120 is inserted into chassis 110, guide rail(s) 128 become slidably engaged within guide rail receivers 128A, thereby facilitating movement of I/O module 120 between an extended position (as shown in FIGS. 2 and 3) and a retracted position (as shown in FIG. 1).

Figure 6:
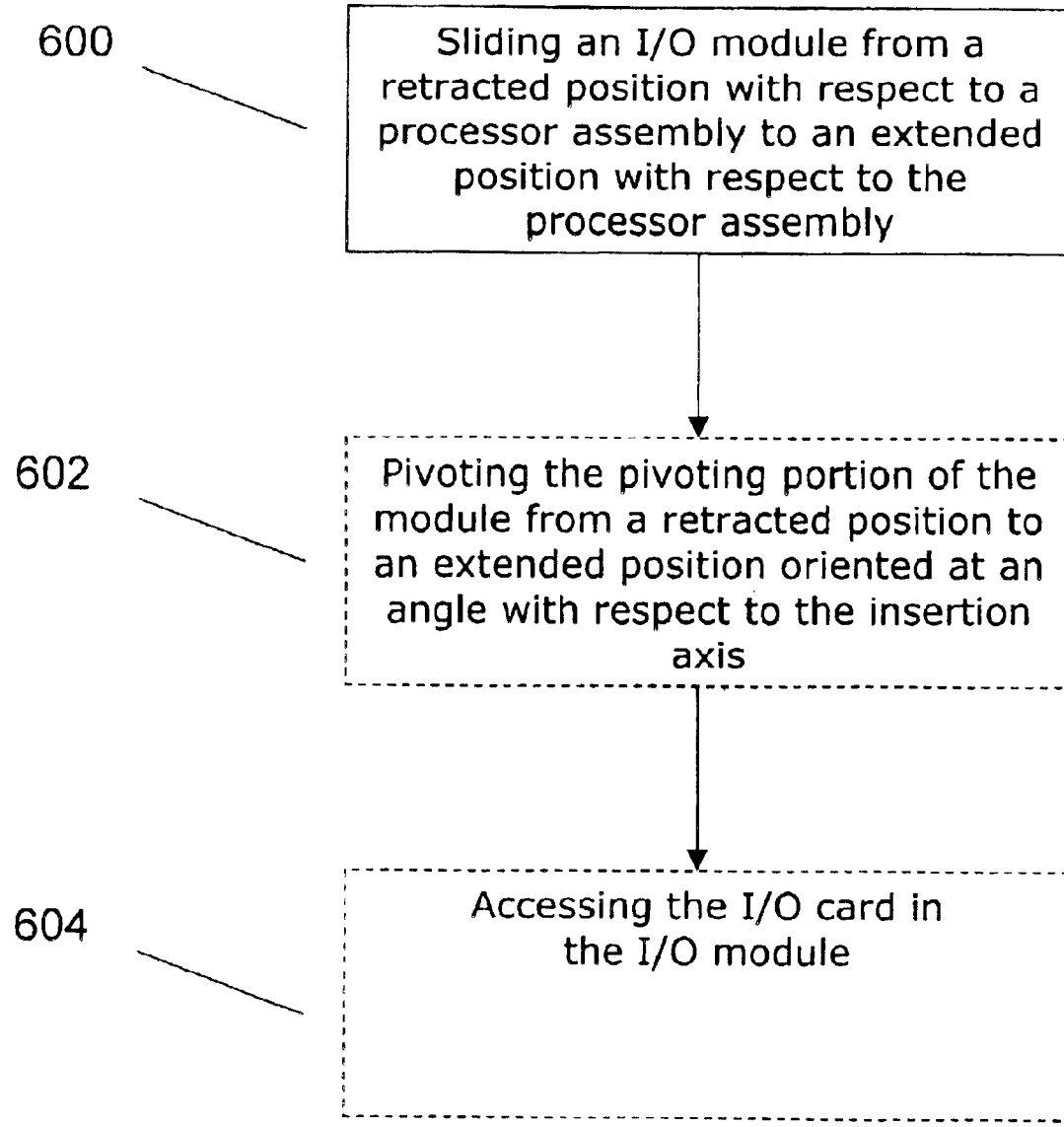
FIG. 6 is a flow diagram illustrating a method of accessing an I/O card in an I/O module in accordance with an exemplary embodiment of the present invention.

FIG. 6 illustrates a method of accessing an I/O component such as an I/O-card in an I/O module. At step 600, the I/O module is slid from a retracted position with respect to a processor assembly (housed in a computer chassis) to an extended position with respect to the processor assembly. In the retracted position, the I/O module is substantially within the interior of the computer chassis. In the extended position, the I/O module is at least partially withdrawn from the interior of the computer chassis. If the I/O component to which access is desired is accessible with the I/O module in the extended position (FIG. 2), the component can be accessed (e.g., removed from the I/O module).

The component may not be accessible with the I/O module in the extended position (FIG. 2), i.e., because the component is too large or too long to be removed through the opening created in the module. If so, at step 602, a pivoting portion of a housing of the I/O module is pivoted with respect to a body portion of the housing of the I/O module from a retracted position where the pivoting portion is substantially aligned with the insertion axis of the I/O module to an extended position where the pivoting portion is oriented at an angle with respect to the insertion axis. After the pivoting portion has been moved to its extended position (and the access opening has been further enlarged), the component (e.g., a PCI card) in the I/O module is accessed (e.g., removed) at step 604.

In summary, according to an exemplary embodiment of the present invention, a computer system 100 is provided included a chassis 110. I/O module 120 is provided in a retracted position substantially within chassis 110. Shield cover 122, which shields against electromagnetic interference, is removed from I/O module 120. Fastener 124 is disengaged, and I/O module 120 is withdrawn from its retracted position to an extended position by sliding guide rail(s) 128 along guide rail receiver(s) 128A. Fastener 126 is disengaged, and pivoting portion 120B is pivoted from a retracted position substantially aligned with the insertion axis of I/O module 120 to an extended position where pivoting portion 120B is oriented at an angle with respect to body portion 120A. I/O components housed within I/O module 120 may then be accessed for replacement, repair, upgrade, or troubleshooting, or for any other reason.

This sliding and pivoting action of I/O module 120 provides access to components housed within I/O module, 120 without interfering with the operation of computer system 100. Unlike a drawer system where the entire computer system is slid away from the rack, according to the present invention, only I/O module 120 is moved with respect to the remainder of the computer system. As such, interconnections between other system components are fixed, and as such, interconnection lengths between the other system components can be reduced to their shortest possible length. Further, since the weight of I/O module 120 is much less than the weight of the entire computer system, the computer rack is much less likely to become unstable when I/O module 120 is brought to its extended position, as opposed to traditional drawer-type systems.

Although the sliding operation of I/O module 120 has primarily been described through the use of guide rails 128 and guide rail receivers 128A, the moving action of I/O module 120 is not limited thereto. Any construction of is elements that facilitates movement (by sliding or other movement) between I/O module 120 and the processor assembly housed within computer system 100 may be utilized.

Although the pivoting action of pivoting portion 120B has been primarily described by reference to pivot pins 132 and 132A, and pivot slots 130, this pivoting action is not limited thereto. Any pivotal or other coupling between body portion 120A and pivoting portion 120B may be utilized.

Although the interconnection of I/O module 120 and the processor assembly included in computer system 100 has been primarily described by reference to a flex circuit, this interconnection is not limited thereto. Any conductive interconnection (e.g., bundled cables, coaxial cables, etc.) may be utilized to provide interconnection between I/O module 120 and the processor assembly.

Also, although this invention has been described in the context of computer server systems, it is contemplated for use with any type of system and is not limited to servers. For example, this invention can be beneficially used in connection with personal computers, main frame computers, and other types of computer systems.

Referring now to FIG. 7, the computer system 100 is illustrated with the cooling source and the interconnect assembly removed. The computer system 100 includes a chassis 110 that defines an interior 403. A plurality of circuit assemblies can be accommodated within the interior 403 of the chassis 110. Specifically, in the embodiment illustrated in FIG. 7, the chassis 110 is sized to accommodate a processor circuit assembly 406A and a memory circuit assembly 406B.

The circuit assemblies 406A and 406B are inserted into the interior of the chassis 110 along an insertion axis Ai that is perpendicular to the page as illustrated in FIG. 7. The circuit assemblies 406A and 406B are then connected to the interconnect assembly (not shown in FIG. 7) by moving each circuit assembly 406A and 406B along the connection axis Ac (to the right in FIG. 7).

Referring now to FIG. 8, a processor circuit assembly 406A is shown partially inserted into the processor region of the chassis 110 along the insertion axis Ai. Upon complete insertion of the processor circuit assembly 406A into the interior 403 of the chassis 110 along the insertion axis Ai, the processor circuit assembly 406A is connected to an interconnect assembly (not shown in FIG. 8) along a connection axis Ac. Referring to FIG. 9, which illustrates an exemplary embodiment of a processor circuit assembly 406A, the processor circuit assembly 406A includes an interface connector 424 that is oriented for connection along the connection axis Ac. The processor circuit assembly 406A also includes an I/O connector 426 that is oriented for connection to a mating connector within the chassis 110 along the insertion axis Ai.

The I/O module 120 is connected to a processor assembly such as processor circuit assembly 406A by means of a connection system that permits movement of the I/O module 120 with respect to the processor circuit assembly 406A. A flexible connection is therefore desirable to permit such relative movement between the I/O module and the processor circuit assembly 406A. More specifically, and as described previously, a flexible connection can be provided between the I/O connector 426 on the processor circuit assembly 406A and a connector on the I/O module. Additional details of an exemplary connection between the movable module and the circuit assembly are described in co-pending U.S. Application Serial No. 10/390,367, which is incorporated herein by reference.

As indicated throughout the foregoing description of various exemplary embodiments of the invention, many modifications can be made to the illustrated embodiments. It will be appreciated that other modifications can be made to the illustrated embodiments without departing from the scope of this invention, which is separately defined in the appended claims.

What is claimed:

1. A computer system comprising:

a computer chassis at least partially defining an interior; and a module configured for movement with respect to said computer chassis along an insertion axis between a retracted position substantially within said interior of said computer chassis and an extended position at least partially withdrawn from said interior of said chassis;

said module comprising a housing configured to extend within said interior of said chassis;

said housing having a body portion configured to move with respect to said computer chassis along said insertion axis; and said housing having a pivoting portion coupled to said body portion of said housing to pivot between a retracted position substantially aligned along said insertion axis and an extended position oriented at an angle with respect to said insertion axis, wherein a plurality of cards are engaged within said pivoting portion of said housing and said cards pivot with said pivoting portion as it is moved toward said extended position.

2. The computer system of claim 1 wherein said module is an I/O module for housing at least one I/O component of the said computer system.

3. The computer system of claim 1 additionally comprising a fastener positioned to secure said module in said retracted position when said fastener is engaged, said module being free for withdrawal toward said extended position when said fastener is disengaged.

4. The computer system of claim 1 additionally comprising at least one fastener positioned to secure said pivoting portion of said housing in said retracted position when said at least one fastener is engaged, said pivoting portion being free to pivot toward said extended position when said at least one fastener is disengaged.

5. The computer system of claim 1 wherein said pivoting portion of said housing of said module houses at least one I/O component of said computer system.

6. The computer system of claim 1 additionally comprising a shield coupled to said module for at least partially shielding electromagnetic energy.

7. The computer system of claim 1 additionally comprising at least one guide rail coupled to said module or to said computer chassis, said guide rail being configured to facilitate movement of said module with respect to said computer chassis along said insertion axis.

8. The computer system of claim 1 additionally comprising a pivot pin fixed to said pivoting portion of said housing or to said body portion of said housing such that relative pivotal motion is facilitated between said pivoting portion and said body portion.

9. A computer system comprising:
   a computer chassis at least partially defining an interior and having a processor assembly positioned within said interior; and
   an I/O module coupled to said processor assembly, said I/O module being configured for movement with respect to said computer chassis along an insertion axis between a retracted position substantially within said interior of said computer chassis and proximal said processor assembly and an extended position at least partially withdrawn from said interior of said chassis and spaced from said processor assembly,
   said I/O module comprising a housing configured to extend within said interior of said computer chassis, said housing including a body portion configured to move with respect to said computer chassis along said insertion axis, said housing also including a pivoting portion coupled to said body portion of said housing to pivot between a retracted position substantially aligned along said insertion axis and an extended position oriented at an angle with respect to said insertion axis,
   wherein a plurality of cards are engaged within said pivoting portion of said housing and said cards pivot with said pivoting portion as it is moved toward said extended position.

10. The computer system of claim 9 additionally comprising at least one guide rail coupled to said module or to said computer chassis, said guide rail being configured to facilitate movement of said module with respect to said computer chassis along said insertion axis.

11. The computer system of claim 9 additionally comprising a fastener positioned to secure said I/O module in said retracted position when said fastener is engaged, said I/O module being free for withdrawal toward said extended position when said fastener is disengaged.

12. The computer system of claim 9 additionally comprising at least one fastener positioned to secure said pivoting portion of said housing in said retracted position when said at least one fastener is engaged, said pivoting portion being free to pivot toward said extended position when said at least one fastener is disengaged.

13. The computer system of claim 9 wherein said pivoting portion houses at least one I/O component of said computer system.

14. The computer system of claim 9 additionally comprising a shield coupled to said I/O module for at least partially shielding electromagnetic energy.

15. The computer system of claim 9 additionally comprising a pivot pin fixed to said pivoting portion of said housing or to said body portion of said housing such that relative pivotal motion is facilitated between said pivoting portion and said body portion.

16. A method of accessing an I/O card, said method comprising the steps of:
   sliding an I/O module with respect to a processor assembly to which the I/O module is connected from a retracted position proximal the processor assembly and substantially within an interior of a computer chassis to an extended position spaced from the processor assembly and at least partially withdrawn from the interior of the computer chassis;
   pivoting a pivoting portion of the I/O module with respect to a body portion of the I/O module from a retracted position substantially aligned along an insertion axis of the I/O module toward an extended position oriented at an angle with respect to the insertion axis; and
   accessing the I/O card in the pivoting portion of the I/O module.

17. The method of claim 16 further comprising the step of:
   disengaging a fastener coupling the I/O module and the computer chassis to free the I/O module for withdrawal toward the extended position.

18. The method of claim 16 further comprising the step of:
   disengaging a fastener coupling the body portion of the I/O module and the pivoting portion of the I/O module to free the pivoting portion to pivot toward the extended position.

19. The method of claim 16 wherein said sliding step includes sliding a guide rail with respect to a guide rail receiver to facilitate sliding movement of the I/O module with respect to the computer chassis along an insertion axis of the I/O module.

20. The method of claim 16 further comprising the step of:
   moving an electromagnetic energy shield with respect to the I/O module such that the I/O module may be slid with respect to the computer chassis.

21. A method of accessing an interior of an I/O module comprising the steps of:
   sliding the I/O module along an insertion axis from a retracted position proximal a processor assembly to which the module is connected and substantially within the interior of a computer chassis to an extended position spaced from the processor assembly and at least partially withdrawn from the computer chassis; and
   pivoting a pivoting portion of the I/O module with respect to a body portion of the module from a retracted position substantially aligned with the insertion axis to an extended position oriented at an angle with respect to the insertion axis, thereby pivoting one or more cards in the pivoting portion of the I/O module, and thereby providing access to one or more of the cards.

* * * * *